United States Patent [19]
Amar et al.

[11] Patent Number: 5,886,658
[45] Date of Patent: Mar. 23, 1999

[54] SERIAL PORT INTERFACE SYSTEM AND METHOD FOR AN ANALOG-TO-DIGITAL CONVERTER

[75] Inventors: Aryesh Amar, Nashua, N.H.; Jerome E. Johnston, Austin, Tex.; Bruce P. Del Signore, Hollis, N.H.

[73] Assignee: Crystal Semiconductor Corporation, Austin, Tex.

[21] Appl. No.: 856,558

[22] Filed: May 15, 1997

[51] Int. Cl.[6] .................................................. H03M 1/00
[52] U.S. Cl. ........................................... 341/155; 395/825
[58] Field of Search ........................... 341/155; 395/825, 395/889, 309

[56] References Cited

U.S. PATENT DOCUMENTS

| | | | |
|---|---|---|---|
| 4,258,417 | 3/1981 | Berglund et al. | 364/200 |
| 5,142,685 | 8/1992 | Furui et al. | 395/800 |
| 5,526,311 | 6/1996 | Kreifels et al. | 365/201 |
| 5,594,442 | 1/1997 | Paulos et al. | 341/143 |
| 5,701,421 | 12/1997 | Miller et al. | 395/309 |

*Primary Examiner*—Marc S. Hoff
*Assistant Examiner*—Peguy Jean Pierre
*Attorney, Agent, or Firm*—Brian W. Peterman; J. P. Violette

[57] ABSTRACT

A novel serial port interface system and method are disclosed. The serial port interface system achieves a three-pin interface mode with only a serial data input pin, a serial data output pin, and a serial clock pin by allocating a bit in an on-chip register to identify a three-pin conversion-done mode. In this three-pin mode, the serial data output pin signals an external device that data is ready to be accessed. Also disclosed with this three-pin conversion-done mode is a single conversion data read and a continuous conversion data read that may be selected through two separate bits in an on-chip register. In another aspect, a multiple register access capability is disclosed that allows multiple on-chip registers to be accessed with a single read/write command. This is accomplished by allocating a register select address in a command register to identify a group of registers, such as all of the set-up registers (gain, offset and configuration). An invalid command lock mode is also disclosed that places the serial port interface in a hold state, if an invalid command is decoded, to protect on-chip registers from corruption. Control of the serial port interface is removed from an external device until a specific restart sequence is applied.

25 Claims, 9 Drawing Sheets

SINGLE CONVERSION DATA READ MODE WITH PF=1

CONTINUOUS CONVERSION DATA READ MODE WITH PF=1

SERIAL PORT INTERFACE SYSTEM AND METHOD FOR AN ANALOG-TO-DIGITAL CONVERTER

BACKGROUND OF THE INVENTION

1. Field of the Invention

This invention relates to serial port interfaces for analog-to-digital converters. In particular, the invention relates to serial port interface systems and methods for providing access to conversion data and internal registers through serial data input and output pins.

2. Description of Related Art

An analog-to-digital converter ("ADC") includes circuitry for converting analog input information into relative digital data information. This digital data information is called "conversion data" and is generally stored in a conversion data register in the ADC. This conversion data register may be of various sizes, but is typically multiples of 8-bits in size (e.g., a 24-bit data conversion register). ADCs also include registers that are used by the ADC on-chip controller to control the operation of the chip. For example, the on-chip controller may use a register to determine whether an external device has requested a read of the conversion data register or has requested a read from or a write to another on-chip register. A variety of on-chip registers may be provided with a variety of functions being performed by the on-chip controller depending upon the contents of those on-chip registers. External devices communicate with the on-chip controller through data written to the on-chip registers through the serial port interface of the ADC. ADCs may have various numbers of external pins (e.g., a 20-pin ADC) that are used to communicate with external devices.

ADCs generally include an on-chip controller that manages chip operation, which may utilize an internal clock, and a plurality of internal registers associated with the controller. One of these registers may be a command register (e.g. 8-bit) that is used to interpret instructions received from an external device through the serial data input pin of the ADC, which is part of the serial port interface. When power is applied, and the device has been reset, the serial data input pin may be initialized into a command mode, where the chip may wait for a command to be written to the command register through the serial data input port. In this command mode, for example, the first 8 bits provided by an external device to the serial data input pin may be placed into the command register. Once this command word has been decoded by the on-chip controller, the serial data input pin may enter a data mode. In this data mode, the serial clock pulses provided by the external device through an input pin shifts data either into the ADC through the serial data input pin or out of the ADC through the serial data output pin. In this manner, the external device may read from or write to the contents of on-chip registers.

Because the on-chip registers include registers that affect the operation of the ADC and the data conversion process, it is important that these on-chip registers are not corrupted by invalid commands, and unintended data transfer to on-chip registers. For example, with the loss of command synchronization, on-chip internal registers might become corrupted by being unintentionally overwritten. Thus, it is desirable to provide a serial port interface having the ability to control the serial port interface upon receipt of an invalid command to protect against corruption of on-chip registers.

Another internal register in an ADC may be a configuration register. Generally, the user may instruct the on-chip controller to perform certain operations through data written to the configuration register. For example, when a new word is written to the configuration register, the controller may decode the word and execute the instructions associated with the word written to the configuration register. Various instructions may be associated with particular bits of the configuration register. Other internal registers may also be provided, such as gain registers and offset registers that may be used in calibrating and operating the data conversion process.

Because there are numerous on-chip registers that may need to be set up at the same time to initialize the ADC and its data conversion process, it is desirable to provide a serial port interface having the ability to access multiple registers with a single read/write command. Although a prior ADC has provided access to multiple registers, it did so by requiring particular bits to be set in a configuration register, before data could be written to or read from the multiple registers.

The serial port interface of the ADC provides serial data access to external devices and includes a subset of the total external pins of the ADC. Prior devices have had multiple pin serial port interface modes including 5-pin, 4-pin and 3-pin modes. Two important industry standard serial port interface protocols, which are both 3-pin protocols, are the SPI interface protocol and the MICROWIRE interface protocol.

Some previous ADCs have achieved a 3-pin mode, but have typically required the use of an external pin to place the chip into a 3-pin mode. For example, an ADC from Crystal Semiconductor (Austin, Tex.), having the designation CS5516, provided a 3-pin interface mode by setting an external pin (SMODE pin) to a logic level "1" (e.g., tied to supply voltage). When this was done, the serial interface would operate as a 3-wire interface using only the SDO pin (serial data output), the SDI pin (serial data input) and the SCLK pin (serial clock). In the 3-wire mode, the $\overline{CS}$ pin (chip select) would be tied to ground, i.e., logic level "0." The $\overline{DRDY}$ pin (data ready) would operate normally, but instead of being used by the external device in the 3-pin mode, this pin would modify the behavior of the SDO pin, allowing the SDO pin to signal the user when conversion data was available. To read conversion data from the conversion data register when in 3-pin mode, the user would first write the appropriate one-byte command word to the SDI pin. The SDO output, which was normally high, would then transition to a low logic level when data was ready to be read. The user could then use 8 SCLKs to the SCLK pin to clear this data ready signal on the SDO pin. On the falling edge of the 8th SCLK, the SDO pin would present the first bit of the 24-bit output word of the conversion data register. Next, 24 SCLKs could then be issued to read the data from the conversion data register via the SDO pin. Once this data read was completed, the SDO pin would transition back to a high logic level.

Other ADCs have provided a 3-pin mode, but have done so by requiring an on-chip register to be interrogated to determine if conversion data is ready to be accessed. For example, an ADC available from Analog Devices (Norwood, Mass.), having the designation AD7714, has provided a three-pin, or three-wire, interface, but did so by requiring a bit of an on-chip register to be interrogated by the external device to determine the status of the external $\overline{DRDY}$ (data ready) pin, and thereby determine if data was ready to be accessed. A logic low on the external $\overline{DRDY}$ pin would indicate that a new output conversion data word was available. In the 3-pin mode, although the $\overline{DRDY}$ pin would not be directly accessed by the external device, the interrogated bit of the on-chip register would indicate the status of the $\overline{\text{DRDY}}$ pin.

It is desirable to provide a serial port interface having the ability to enter a 3-pin mode without requiring the use of an external pin to enter 3-pin mode or requiring the interrogation of an on-chip register to determine if data is ready to be accessed.

What is needed, therefore, is a serial port interface system and method that are capable of more efficiently achieving a 3-pin mode with only three pins, are capable of determining if an invalid command has been received and allow for hold and recovery upon an invalid command, and are capable of allowing an external device to access multiple registers with a single read/write command.

SUMMARY OF THE INVENTION

The present invention provides a serial port interface system and method that achieves a 3-pin interface mode with only a serial data input pin, a serial data output pin, and a serial clock pin. The present invention also provides a serial port interface system that allows an external device to access multiple on-chip registers with a single read/write command. Finally, the present invention provides a serial port interface system that places the serial port interface in a hold state if an invalid command has been received to protect on-chip registers from being corrupted.

To accomplish the 3-pin mode, the present invention allocates a bit in an internal on-chip register to identify that a conversion-done mode should be entered. Once in the conversion-done mode, the serial data output pin transitions low to signal the external device that conversion data is ready to be accessed from the conversion data register. The present invention also provides a single conversion mode, in which the serial data output pin transitions only once to signal that data is ready, and a continuous conversion mode, in which the serial data output pin transitions each time data is ready until the mode is exited by an appropriate command.

In one particular embodiment, a three-pin serial port interface system according to the present invention may include a multiple bit register having at least one bit allocated to select a three-pin conversion-done mode when set to a specific logic level; a serial data input pin through which an external device may write data to the multiple bit register; a serial data output pin through which conversion data may be read by the external device; and a serial clock input pin through which said external device may time data being accessed through said serial data output pin. In this embodiment, the serial data output pin signals the external device that the conversion data is ready to be accessed by transitioning from a first logic level to a second logic level when the bit in said multiple bit register is set to select the three-pin conversion-done mode. Further, the system may include synchronization circuitry communicating with the serial clock input pin and an internal data clock to synchronize clock signals. Another embodiment of the present invention is an associated method.

The present invention also achieves multiple register access by allocating one of the register select options in the command register to identify a multiple register access. When this register option is selected, the chip operates a read or write operation on multiple registers with a single read/write command. Writing multiple registers with a single command allows systems with no external microcontroller to initialize the ADC with a less complicated startup circuit.

In another particular embodiment, a serial port interface system in an analog-to-digital converter for locking a serial port interface upon determination of an invalid command may include a multiple bit command register having a set of valid codes; a serial input pin through which an external device may write commands to the multiple bit command register; and a controller communicating with the multiple bit register and the serial input pin to determine command validity and to place the serial input pin in a hold state upon determination of an invalid command. Further, controller may communicate with the serial input pin to release the serial input pin from the hold state when a predetermined restart sequence is applied to the serial input pin. Another embodiment of the present invention is an associated method.

The present invention further achieves invalid command control by placing the serial data input pin in hold state once an invalid command has been received. This hold state removes control of the serial port from the external device and requires that a restart sequence be applied by the external device before control is given back to the external device. In this manner, the serial port interface protects internal on-chip registers, and the set-up registers in particular, from being corrupted when the ADC and the external device lose communication integrity.

In a further embodiment, a serial port interface system in an analog-to-digital converter for accessing a plurality of multiple bit registers with a single read/write command may include a plurality of multiple bit registers in an analog-to-digital converter to which data may be written and from which data may be read; a multiple register access address associated with the plurality of multiple bit registers; and a multiple bit command register having a plurality of bits allocated to select an address of an internal register including the multiple register access address, and having at least one bit allocated to a read/write command, wherein a single read/write command with the multiple register access address selected will access each of the plurality of multiple bit registers in some predetermined sequence. Another embodiment of the present invention is an associated method.

BRIEF DESCRIPTION OF THE DRAWINGS

It is to be noted that the appended drawings illustrate only particular embodiments of the invention and are, therefore, not to be considered limiting of its scope, for the invention may admit to other effective embodiments.

DESCRIPTION OF PREFERRED EMBODIMENTS

The present invention is directed to the serial port interface system and methods for an analog-to-digital converter (ADC). Although prior ADC serial port interface systems have provided 3-pin functionality, they have required the use of a dedicated pin, or have relied upon a data-ready flag in an on-chip register, to enter that mode. The present invention accomplishes 3-pin mode without these requirements by allocating a bit of an internal on-chip register to select a conversion-done mode, and by using the serial output pin to signal that data is ready to be read. The present invention also provides multiple register access through a single read/write command, and an invalid command lock mode.

Figure 1:
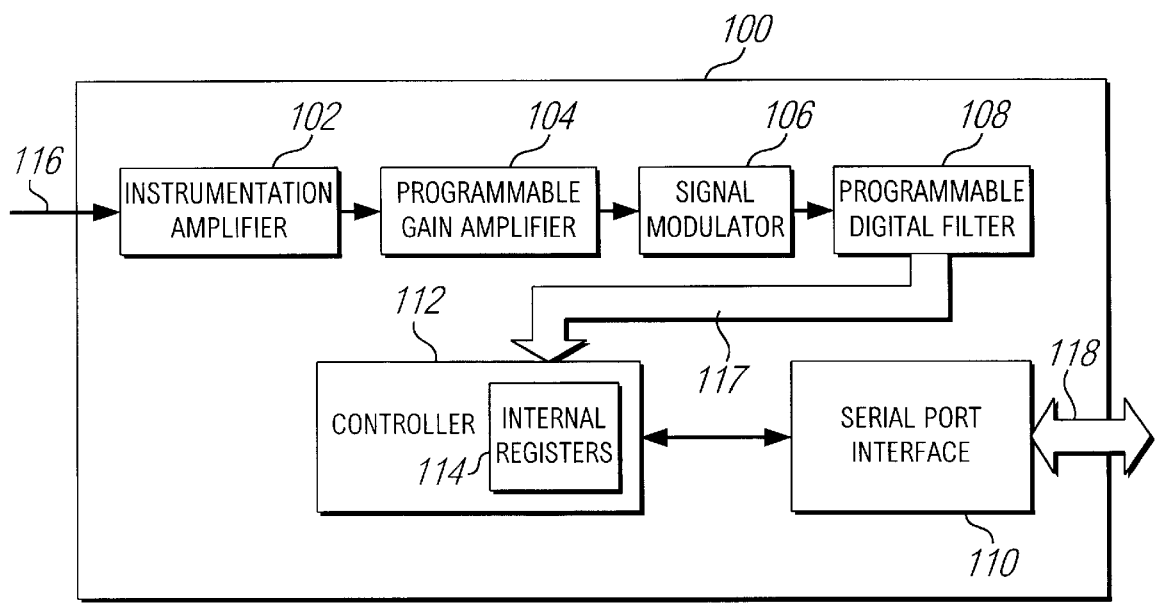
FIG. 1 is a block diagram of the internal structure of a typical analog-to-digital converter (ADC).

FIG. 1 shows a block diagram of the basic structure of an analog-to-digital converter (ADC) 100. ADC 100 may include an instrumentation amplifier 102, a programmable gain amplifier 104, a signal modulator 106, and a programmable digital filter 108. ADC 100 operates to convert an analog input 116 into a digital output 118. Digital output 118 is provided to an external device through serial port interface 110. ADC 100 also includes an internal controller 112 that controls the overall operation of the internal circuitry of the ADC, including the serial port interface 110. The controller 112 has internal registers 114 that are used by controller 112 to receive commands from external devices and to operate the internal circuitry. The controller 112 may also utilize an internal clock to time on-chip operations.

The signal modulator 106 may be a differential fourth order delta/sigma modulator. The internal registers 114 may include a plurality of internal on-chip registers including a command register, a configuration register, a gain register, an offset register, and a conversion data register. The conversion data register may be used to hold conversion data representing the transformation of analog input data 116 into digital data 117. ADCs of the structure depicted in FIG. 1 are available, for example, from Crystal Semiconductor (Austin, Tex.).

Figures 2, 3:
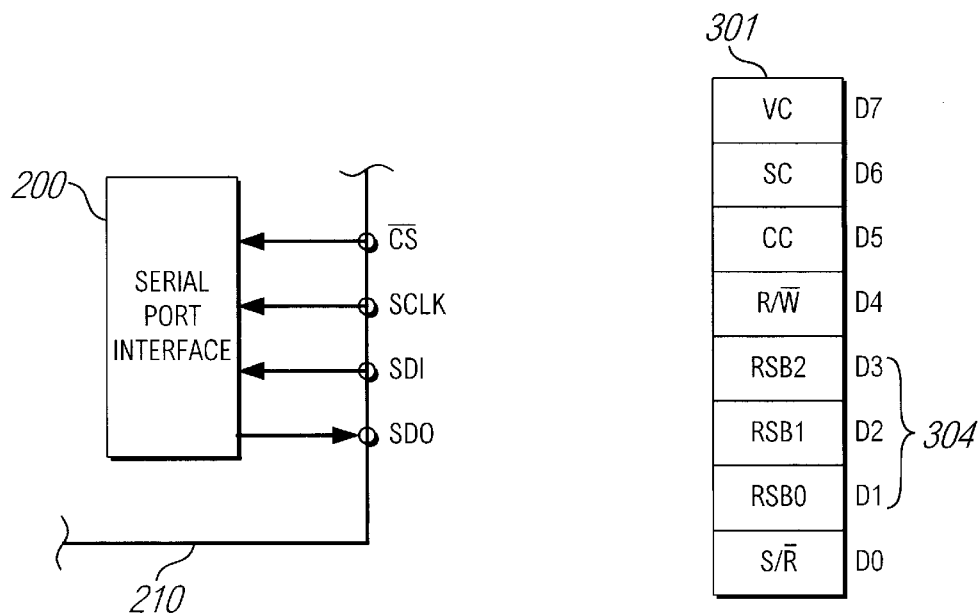
FIG. 2 is a diagram of a serial port interface of an analog-to-digital converter according to the present invention.
FIG. 3 is a diagram of an 8-bit command register for an analog-to-digital converter according to the present invention.

FIG. 2 is a diagram of a serial port interface 200 of an ADC 210 according to the present invention. Serial port interface 200 includes 3 input pins and 1 output pin. The input pins are the $\overline{CS}$ pin, the SCLK pin, and the SDI pin. The output pin is the SDO pin. FIG. 3 shows a command register 301 associated with serial port interface 200.

It is noted here that typically a high logic level for a signal, e.g. SCLK, indicates that it has been asserted or activated, while a low logic level for the same signal indicates that it has been deasserted or deactivated. Conversely, if the signal is designated with an overscore, e.g. $\overline{CS}$, a low logic level indicates that the signal has been asserted or activated, and a high level indicates that it has been deasserted or deactivated. It is understood that signals may generally be made to be high level activating or low level activating without a change to the operation of the device, although a change to the structure of the device may be necessary. Similarly, signals that provide an indication by transitioning from a high to a low logic level may be altered to provide that indication by transitioning from a low to a high logic level. This is a design choice that does not generally affect the operation of the device.

Referring to the embodiment depicted in FIG. 3, the command register 301 is an 8-bit register including bits D7-D0, although the command register may be of another size if desired. The D7 bit is a command valid flag (VC). If VC=0, there is no operation, and a null command is given if D6-D0 are also set to logic level "0." The D6 bit includes a single-conversion mode flag SC that identifies whether the chip is to enter into a single conversion mode. The D5 bit includes a continuous conversion mode flag CC that identifies whether the chip is to enter into a continuous conversion mode. The D4 bit is a read/write command R/$\overline{W}$ that tells the controller whether to write to a selected register or to read from a selected register. If this bit is at a logic level "1," a read command is executed with the selected register, while if the bit is a logic level "0," a write command is executed with the selected register. The D3-D1 bits provide a register select address RSB2-RSB0 that identifies a register select address 304. These 3 bits provide a possibility of 8 different registers that may be selected. The registers, for example, may include an offset register selectable with "000," a gain register selectable with "001," a configuration register selectable with "010," and a conversion data register selectable with "011." In addition, according to the present invention as discussed below, one of the eight possible addresses (e.g., "100") may select multiple registers such as all of the set-up registers (e.g., the offset, gain, and configuration registers). Finally, the D0 bit includes a standby/run flag S/$\overline{R}$ that tells the controller whether to place the chip in a run mode (bit=0) or a standby mode (bit=1). The standby mode may also be implemented with bits in other on-chip registers, such as the configuration register, if desired.

The serial port interface may operate in a byte oriented fashion, and may have two modes of operation—a data mode and a command mode. The serial port interface may be initialized in the command mode upon power-on. In the command mode, the serial port waits for a valid command byte to be written by the user to the command register through the SDI pin. In the data mode, data is either transferred into or out of the internal on-chip registers through the SDO pin on successive clock cycles supplied by an off-chip controller through the SCLK pin.

The chip may contain a plurality of set-up registers, including a conversion data register (which may be read only), offset registers, gain registers, and a configuration register. Each of these registers may be 24 bits long, or may be other lengths. To access these registers, a command consisting of the address of the particular register may be issued through the command register and the RSB2-RSB0 bits. Depending upon the read or write operation being requested, during the next 24 SCLKs following the command, data is either transferred into or out of the selected register. Once the transfer is completed, the serial port interface goes back to command mode.

The configuration register may be used to execute operational instructions. For example, one bit of the configuration register may be allocated to be a conversion data ready flag (DF), which identifies the time when the processing circuitry has completed a conversion and conversion data is ready to be read from the conversion data register.

Figure 4:
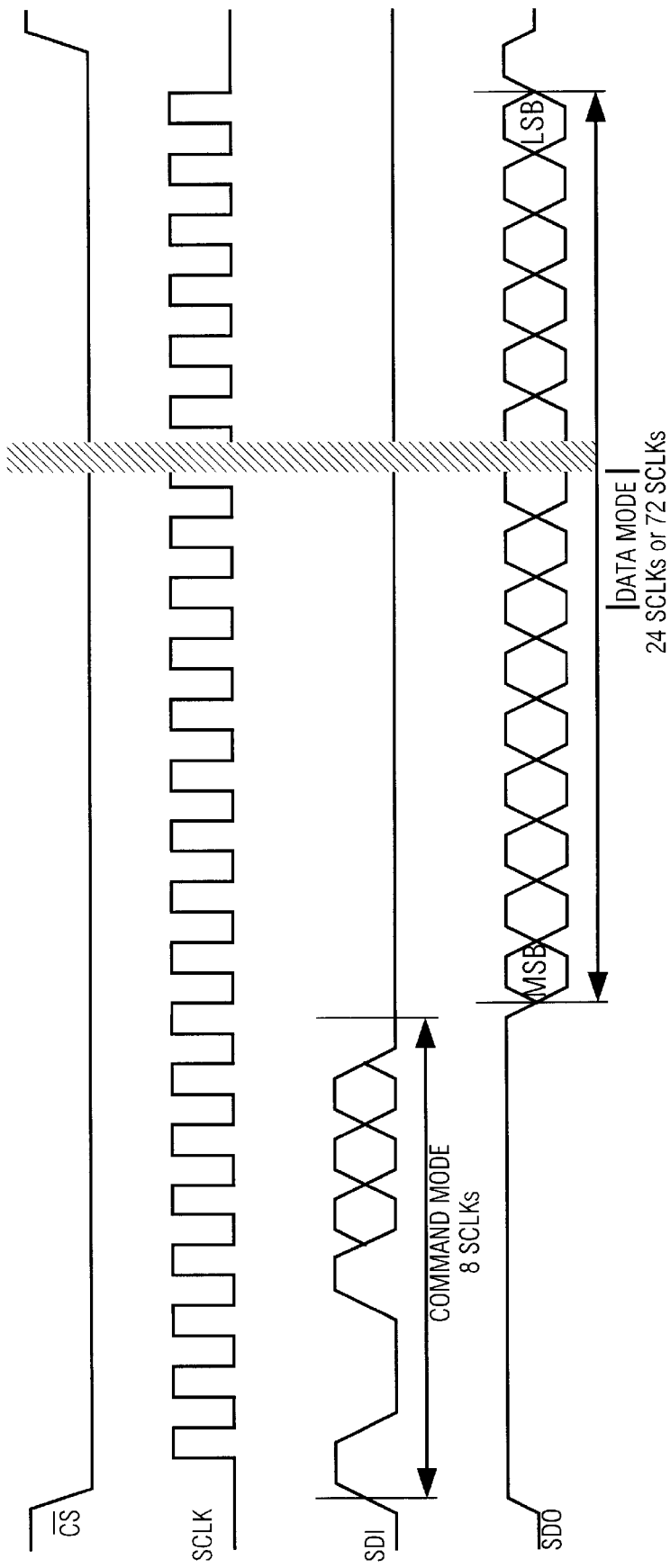
FIG. 4 is a timing diagram for a read command through the serial data output pin of a serial port interface of an analog-to-digital converter without using the conversion-done mode.

FIG. 4 depicts an example timing sequence for a read from an on-chip register via the serial port without use of the conversion-done mode discussed below. The user first sets the $\overline{CS}$ bit low, and provides a clock cycle to the SCLK pin. The SDI pin looks for a command in the command mode region as shown in FIG. 4. The command depicted in FIG. 4 is 1001XXX0, which represents a command to read from the register identified by the XXX (RSB2-RSB0) register selection bits. Assuming that the register being read is 24-bit, the SDO pin provides those 24 bits from MSB to LSB in the next 24 SCLKs after the command mode. This is shown as the data mode in FIG. 4.

As shown in the embodiment in FIG. 2, the serial port interface 200 consist of 4 pins: the SCLK, SDO, SDI, and $\overline{CS}$ pin. The CS pin is held low (logic 0) before the SCLK transitions will be recognized by the port logic. The SDO output may be held at a high impedance any time $\overline{CS}$ is a logic 1. If the $\overline{CS}$ pin is tied low, the port functions in 3-pin mode, as a three-wire interface. The SCLK input may be designed with a Schmitt-trigger input to allow an optoisolator with slower rise and fall times to directly drive the pin.

The serial port interface may be initialized to the command mode when a power-on reset is performed inside the ADC. Also, the serial port interface may be initialized upon receipt of an initialization sequence. The port initialization sequence may be clocking 15 (or more) bytes of all logic level 1s, followed by one byte with the contents "11111110" (on to SDI pin). This sequence may place the chip in the command mode, waiting for a command to be written.

At the completion of a data conversion, the DF (done flag) bit of the configuration register may be set to a logic 1. The user can then issue a read command to read the configuration register to determine if the DF bit has been set. If DF is a logic 1, it will be cleared to logic 0 when the data register, the gain register, the offset register, or the set-up registers are read. Reading only the configuration register will not clear the DF bit. Thus, after an off-chip controller has determined that the DF bit has been set, a command can be issued to read the conversion data register to obtain the single conversion word.

Three-Pin Conversion-Done Mode for Three-Wire Interface

According to the present invention, a conversion-done mode is provided to achieve a 3-pin mode by modifying the serial data output pin to indicate availability of new conversion data when a bit of an internal register is set to a specific logic level. As described above, the serial interface may be a 4-pin serial port, including the pins: (1) SCLK (serial clock), for a clock signal provided by an off-chip controller; (2) $\overline{CS}$ (chip select bar), for an input from an off-chip controller to enable the chip to recognize SCLK; (3) SDO (serial data output), for serial data output; and (4) SDI (serial data input), for serial data input. With the CS pin tied low, these 4 pins act as 3-pin interface. In this 3-pin mode, the SDO pin of the device also acts as a signal to the off-chip controller that conversion data is ready to be accessed.

To provide this 3-pin mode where the SDO pin acts to signal that data is ready, the present invention allocates one bit of an internal register to be a flag to indicate to the on-chip controller that the conversion-done mode should be entered. In particular, the external device may set a PF (port flag) bit in the configuration register to modify the behavior of the output pin SDO. The configuration register may be a 24-bit internal register. When the PF bit is set to logic level 1, the on-chip controller modifies the SDO pin to perform the functionality of indicating the completion of a conversion and the availability of a new conversion data word.

In operation, if the PF bit is set to logic level 1 and a conversion is evoked by a suitable command (SC=1 or CC=1 in the command byte), the SDO pin may be made to go to logic level 0 upon the completion of conversion. The SC bit and the CC bit, may be allocated in the command register to signify that a single conversion or a continuous conversion mode should be entered. Thus, the PF bit, the CC bit, and the SC bit may be used together to both identify the conversion-done mode (SDO pin signals data ready) and to issue a single or a continuous conversion command to the on-chip controller to cause a read of the conversion data register. It is noted that the command register could be altered such that no bit was allocated to identify a single or continuous conversion, such that if the PF bit were set to a logic level 1, the on-chip controller would automatically execute a single or multiple read of the conversion data register.

Once the 3-pin conversion-done mode is entered, and a single conversion or continuous conversion command is written to the command register, SDO falls upon completion of conversion, indicating that conversion is done. Now the user may provide 8 SCLKs to the SCLK pin to clear the SDO flag. The next 24 SCLKs may be used to output the 24-bit data word from the conversion data register via the SDO pin. Thus, the data available at the SDO pin during the first 8 of these 32 SCLKs are ignored by the user.

Figure 5:
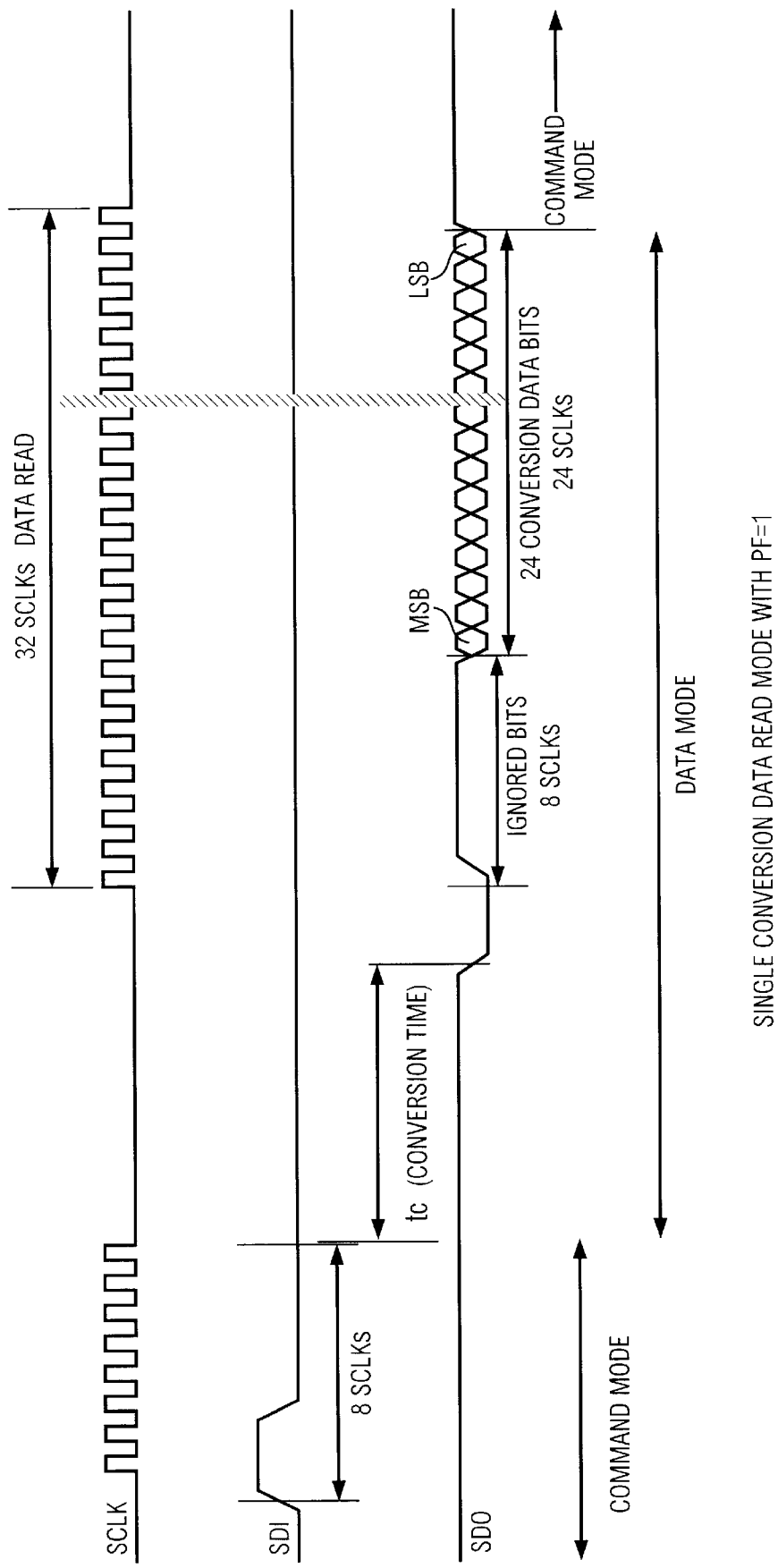
FIG. 5 is a timing diagram for a read command through the serial data output pin of a serial port interface of an analog-to-digital converter using a single conversion conversion-done mode.
Figure 6:
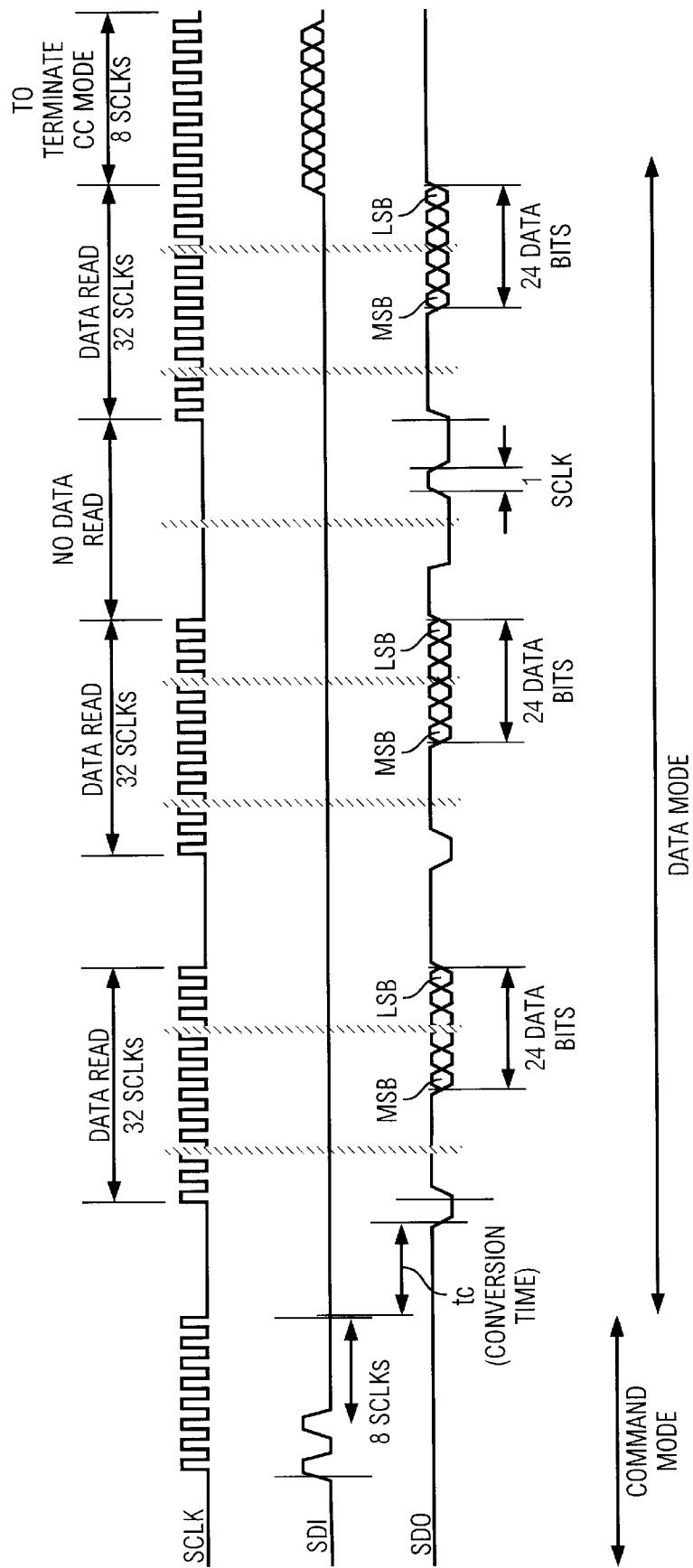
FIG. 6 is a timing diagram for a read command through the serial data output pin of a serial port interface of an analog-to-digital converter using a continuous conversion conversion-done mode.

FIG. 5 shows an example timing diagram for a single conversion (SC=1) data read in 3-pin conversion-done (PF=1) mode. FIG. 6 shows an example timing diagram for a continuous conversion (CC=1) data read in 3-pin conversion-done (PF=1) mode.

In single-conversion mode, the user may be required to read the conversion data register before the serial port interface will go back to the command mode and wait for a new command to be written to the command register. In continuous-conversion mode, the user may decide not to read the conversion data each time the SDO pin falls. In the event that the conversion data for the recently finished filter cycle is not read, the SDO pin output may return high one on-chip system clock cycle (DCLK) before the completion of the new filter cycle. This allows the SDO pin to fall again to indicate the availability of new conversion data. Providing all zeros to the SDI pin during the conversion data read, will allow the user to stay in CC mode. To terminate the CC mode, a valid command (except the null command) may be written immediately after the conversion data read. This is depicted in the example timing diagram shown in FIG. 6.

In addition, if a calibration is performed with the PF bit set to logic 1, the SDO pin may fall to indicate the completion of the requested calibration. This additional functionality allows a user to identify the completion of calibration using the SDO pin. During calibration, the serial port remains in command mode. However, during calibration, a user should wait for the SDO pin to go low, before writing a new command.

Referring now in more detail to the example timing diagram in FIG. 5, a single conversion (SC=1) data read operation in 3-pin conversion-done mode (PF=1) is shown. The command issued to the controller through the SDI pin during the command mode in FIG. 5 is "11000000." This command corresponds to a command with only the VC bit and the SC bit set to 1 in the command register. Once this command is received with the PF bit equaling 1, the chip proceeds to perform a single conversion, and the SDO pin falls when the conversion is complete. After the conversion, 8 SCLKs may be issued to the SCLK pin to clear the SDO pin. Following those 8 SCLKs, the SDO pin will provide the 24 conversion data bits from the conversion data register to the external device. The timing diagram for this operation is depicted in the data mode in FIG. 5.

Referring now in more detail to the example timing diagram in FIG. 6, a continuous conversion data read (CC=1) operation in 3-pin conversion-done mode (PF =1) is shown. In this example, the SDI pin receives a command of "10100000" corresponding to a command with only the CC bit set to 1 along with the VC bit. The device then enters data mode as shown in FIG. 6. After a conversion time for the analog input to be loaded into the conversion data register, the SDO pin will fall to logic level 0. At that point, the user may issue 8 SCLKs, after which the SDO pin will provide the output data bits from the conversion data register. Those are shown as the first 24 data bits of the SDO pin in FIG. 6. The chip stays in the continuous conversion mode, and when a new conversion data bit is ready, the SDO pin again drops low as shown in FIG. 6. Again, the user may issue clock cycles to the SCLK pin to read the data from the conversion data register through the SDO pin. As indicated above, the user need not read data that is available as shown in FIG. 6 in the "no data read" region. The SDO pin will rise one on-chip clock cycle (DCLK) before the next conversion data is ready. The SDO pin will then fall to logic level 0 as indicated in FIG. 6 when the conversion data is ready to be read. The user may then again provide SCLKs to the SCLK pin to obtain the data from the conversion data register. To terminate the continuous conversion mode, the user may issue a command to the SDI pin once the conversion data has been output on the SDO pin. As shown in FIG. 6, in the "to terminate CC mode" region, a command may be sent to the SDI pin represented as a "1XXXXXXX" in FIG. 6.

The user need not give an explicit command to read the conversion data register when the PF bit is set to logic 1. If an explicit command to read the data register is issued, the last conversion data word may be made available. After reading the data register, however, the serial port may go to command mode and wait for a new command to be issued. No more continuous 5 conversions would be performed unless a new command (CC=1) is issued.

The present invention, therefore, uses a bit in an on-chip register (e.g., PF bit in the configuration register) as a flag for modifying the behavior of the SDO pin to indicate the completion of a desired operation (e.g., calibration or conversion). To accomplish this modification, synchronization logic circuitry is used because the serial port interface is getting a clock signal via the SCLK pin from an off-chip controller, whereas the filter and the accompanying on-chip circuitry of the ADC works on an internal clock DCLK. These two clocks SCLK and DCLK are generally expected to be asynchronous with respect to each other. Thus, there is a need for synchronization logic when the chip is operating in a conversion-done (PF=1) mode.

Figure 7:
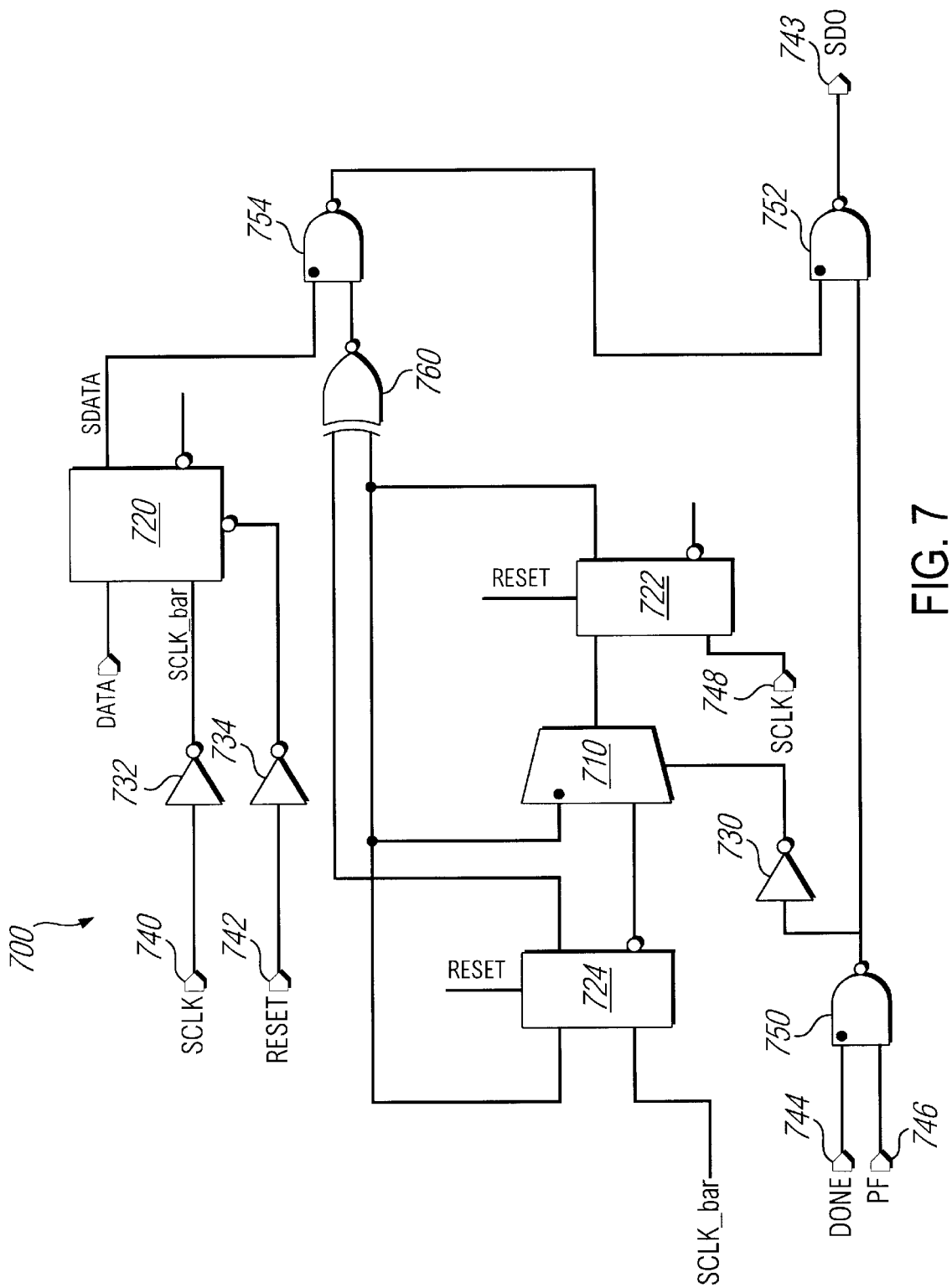
FIG. 7 is a schematic diagram of synchronization circuitry for synchronizing data transfer between the analog-to-digital converter and the external device due to non-synchronization between the on-chip clock (DCLK) and the clock applied to the serial port interface (SCLK).

FIG. 7 represents an example of such synchronization logic circuitry. Synchronization logic circuitry 700 allows for the internal on-chip clock (DCLK) and externally applied serial data clock (SCLK) to be synchronized so that the signal provided to the off-chip controller through the SDO pin, which indicates that the conversion or calibration cycle has ended, is synchronized with the internal operations of the on-chip conversion and calibration circuitry of the ADC.

Synchronization logic circuitry 700 may include: (1) 2-1 multiplexer 710, (2) D flipflops (DFF) 720, 722 and 724, and (3) inverters 730, 732 and 734. In addition, synchronization logic circuitry 700 may provide logic circuits in the form of: (1) NAND gates 750, 752 and 754 and (2) XNOR gate 760. Finally, synchronization logic circuitry 700 may include buffers 740, 742, 743, 744, 746 and 748 associated with input and output signals. FIG. 7 also shows signals used in the synchronization logic circuitry 700. These signals are DATA, SDATA, RESET, SCLK, DONE, PF, DCLK, SDO, and SCLK_bar. (It is noted that the suffix "_bar" is used to signify an overscore and, therefore, has the same meaning as an overscore.)

In operation, the DONE signal is asserted on DCLK upon the completion of the convolution cycle by the filter controller (not-shown) of the analog-to-digital converter. When PF=0, the FLAG signal is made high, so that SDATA is passed to SDO on the falling edges of SCLK. When PF=1 and DONE=1, the FLAG signal is forced low and SDO is forced high. On the next rising edge of DCLK, SDO is then forced low to indicate the availability of the new conversion word. At this point, the user may read the new data. SDO remains low until a data read is initiated (i.e., first falling edge of SCLK). In the case where the user chooses not to read the new data, SDO is forced high at the next assertion of the DONE signal, so that it can fall again to indicate availability of new conversion data.

Multiple Register Access with a Single Read/Write Command

The present invention also provides a serial port interface having multiple register access with a single read/write command. This additional functionality provides significant advantages, and in particular reduces access and initialization time required when loading the on-chip set-up registers prior to exercising conversions. The set-up registers may include an offset register, a gain register and a configuration register that are used to calibrate and initialize the on-chip data conversion operations. With the present invention, each of these registers may be loaded sequentially with data provided to the SDI pin of the ADC with a single command.

Figure 8A:
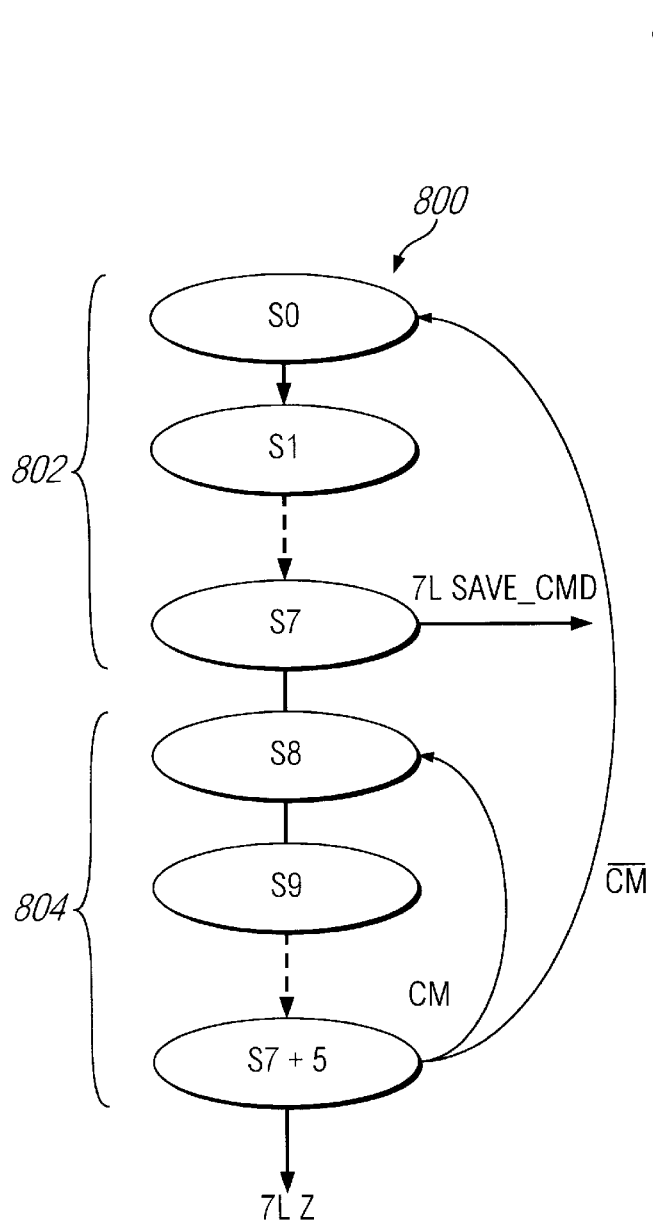
FIG. 8A is a diagram of a finite state machine for reading from or writing to multiple on-chip registers with a single read/write command.
Figure 8C:
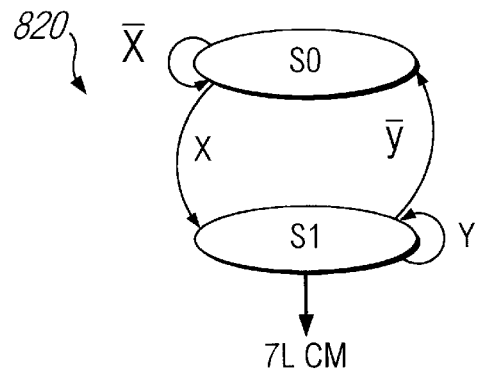
FIG. 8C is a diagram of a finite state machine that keeps the chip in a data read or data write mode when multiple registers are being accessed.
Figure 8B:
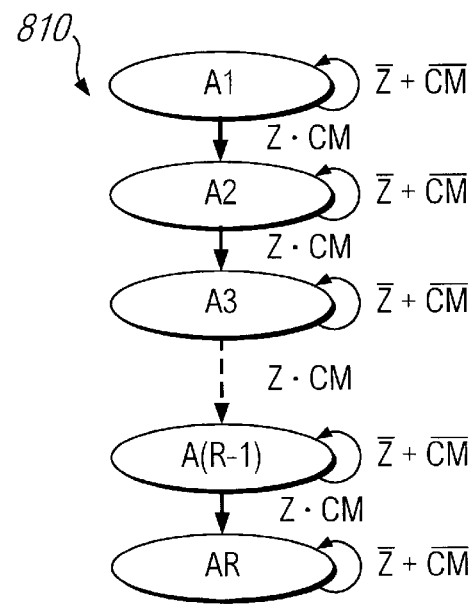
FIG. 8B is a diagram of a finite state machine that provides multiple addresses associated with the multiple registers being accessed.

To accomplish this functionality, the present invention allocates one of the register select combinations in the command register to identify a multiple register access mode, and utilizes the finite state machines (FSMs) depicted in FIG. 8A, FIG. 8B and FIG. 8C. For example, if the load multiple registers (e.g. set-up registers) address (100) is chosen with the RS2-RS0 bits of the command register depicted in FIG. 3, multiple registers may be read from or written to with a single read/write command.

The sequence of this multiple access may be predetermined. For example, this multiple access may be of three set-up registers in the following sequence: a 24-bit offset register, a 24-bit gain register, and a 24-bit configuration register. A multiple register access read command, therefore, may be accomplished by a single 8-bit read command issued to the SDI pin after which three 24-bit data words will be provided at the SDO pin. Thus, in FIG. 4, the data mode may be 72 SCLKs if the command on the SDI pin was "10011000," which indicates a read of the 3 set-up registers. Similarly, if the user wants to load the set-up registers, the user may provide a byte long command to select a write to the multiple register access mode representing the set-up registers, followed by 9 bytes of data on the next 72 SCLKs. In this way, the selected multiple registers, i.e., the set-up registers, are loaded with data.

The present invention contemplates allocating one of the register select modes through the RSB2-RSB0 bits in the command register to identify a multiple register access mode. If is desired, more than one register select mode may be allocated, and different sets of multiple registers may be grouped. As mentioned above, of particular utility is the grouping of all of the on-chip set-up registers for data conversion. When the multiple access mode for all of the set-up registers is selected, the chip will either write data to all of the set-up registers, or allow data to be read from all of the set-up registers, by the user issuing a single one-byte command.

This advantageous functionality is also accomplished by using finite state machines (FSMs) that detect the multiple register access mode and that automatically change the address for the registers after each register has been accessed. Once each of the grouped registers are read from or written to, the serial port interface returns back to the command mode. Thus, with a single one-byte command, the user may access the information in multiple registers. This multiple register access mode significantly reduces the time required to set up the chip for conversion operations. Although the grouped registers may all be the same size (e.g. 24-bit registers), they need not be of identical size or any particular size.

FIG. 8A, FIG. 8B and FIG. 8C are diagrams of example finite state machines (FSMs) that may be used to carry out the multiple register access mode. FSM 800 of FIG. 8A and FSM 820 of FIG. 8C are initialized into state S0 on power-on. Referring to FSM 800 in FIG. 8A, the CM signal (asserted in state S1 of FSM 820 of FIG. 8C) will normally be set to logic level 0. If a register is to be read/written, an appropriate command (containing the address of that register) is issued by the user. State S7 of FSM 800 generates a signal "SAVE_CMD," which is used to store the command on the next rising edge of SCLK. For example, if the register to be accessed is "S" bits long, during the next "S" SCLKs, data is transferred into or out of the chip from state S8 to state (S7+S). Without invoking the multiple register access mode, only one internal register may be accessed at a time.

By incorporating FSM 810 in FIG. 8B and FSM 820 in FIG. 8C, the user is allowed to access "R" different registers in a predetermined order by using only one read/write command. In FSM 820 in FIG. 8C, the X signal represents a logic level dependent upon the logic equation [SAVE_ CMD]·[whether the RS2-RS0 bits have selected the multiple register access mode for the grouped registers]. In FSM 820 in FIG. 8C, the Y signal represents the result of the logic equation [A1+A2. . . A(R−1)], where the designation [A1+ A2. . . A(R−1)] represents the addresses of the grouped registers except for the last register A(R). It is noted that if additional RSB2-RSB0 combinations are allocated to grouped registers, additional FSMs would likely be necessary. FSM 810 of FIG. 8B is initialized in State A1 on power-on and whenever multiple register access mode is used.

If a command directed to the multiple register access mode (e.g., grouped set-up registers) is given, FSM 810 is initiated into a state corresponding to the address of the first register to be accessed. A CM signal is generated by FSM 820, which is used to automatically change the address bits of FSM 810 after every "S" SCLKs, assuming that each of the grouped registers is "S" bits in size. This CM signal to FSM 810 is provided with the Z signal from state (S7+S) in FSM 800 to move FSM 810 from A1 to A2 through A(R). FSM 800 stays in the data mode loop 804 (state S8 to state (S7+S)) unless CM is deasserted and set to logic level 0. Once FSM 810 reaches state AR corresponding to the address of the last register to be accessed, CM is deasserted and set to logic level 0, thus sending FSM 800 back to state S0 and the command mode 802. In this way, the user may stay in the data mode and access all of the grouped on-chip registers with a signal one byte read/write command Serial Port Interface Lock Mode for Invalid Commands The present invention also provides a serial port interface that is able to handle invalid commands so that upon the on-chip determination of an invalid command, the user is denied control of the serial port interface and is protected from inadvertently corrupting the internal registers of the ADC. This functionality is accomplished by locking the serial port interface upon a determination of an invalid command. This lock mode may be implemented using additional finite statement machines (FSMs) depicted in FIG. 9A and 9B.

Figure 9B:
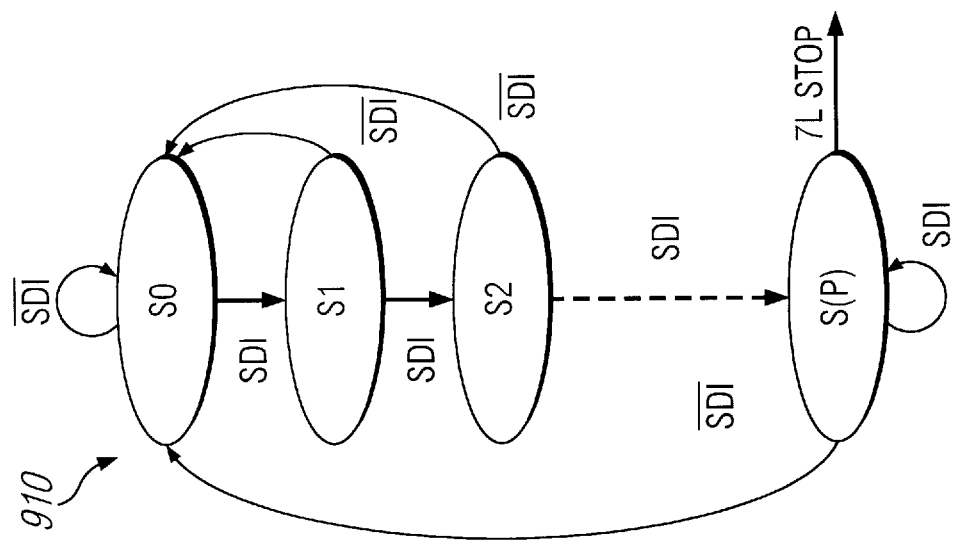
FIG. 9B is a diagram of a finite state machine that determines whether an external device has accomplished the initialization process to regain control of the serial port interface.
Figure 9A:
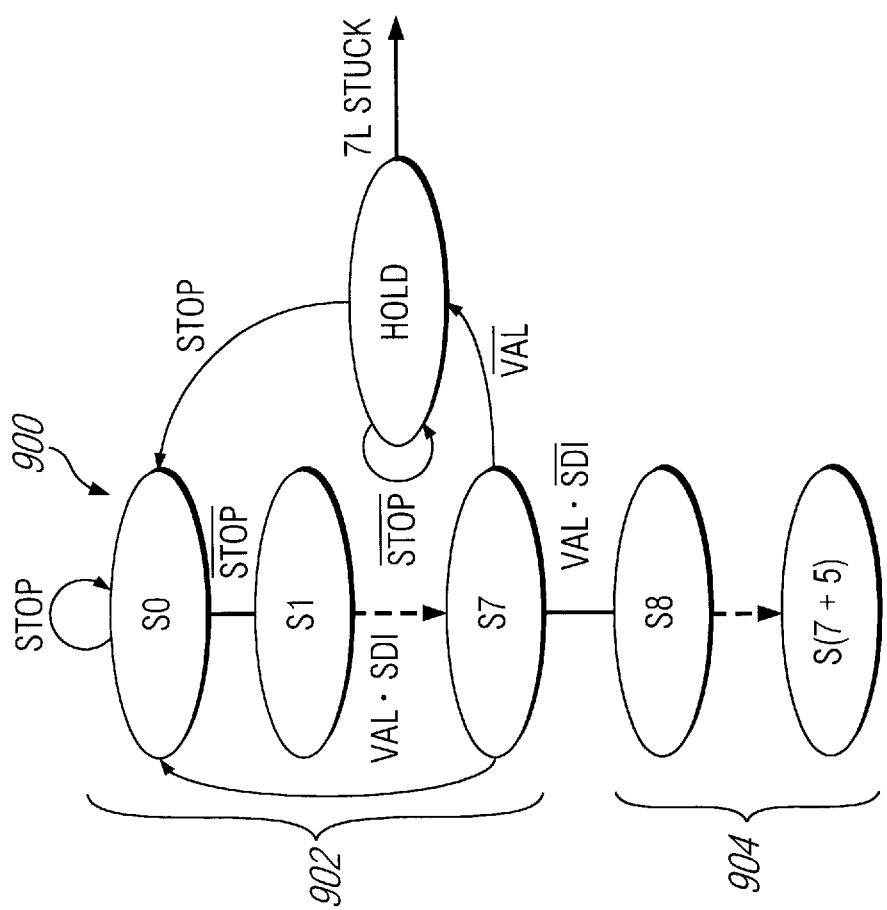
FIG. 9A is a diagram of a finite state machine for placing the serial port interface in a hold state once an invalid command has been decoded by the on-chip controller.

Upon reset of the chip, FSM 900 in FIG. 9A and FSM 910 in FIG. 9B are both initialized to states S0, respectively. State S7 of FSM 900 is the decision making state of FSM 900. On the next rising edge of SCLK (after entering state S7), decision is taken either to proceed to the data mode 904, by advancing to state S8, or to continue to stay in command mode 902, by going back to state S0. This decision depends upon whether the command written in the command register is valid. The validity of the command is determined by the on-chip controller by decoding the command and comparing it to the available valid commands. If it is determined that an invalid command has been issued, the $\overline{\text{VAL}}$ signal (which is equivalent to the INV signal in FIG. 10A) will go high. If the command is valid, VAL will be at a high logic level. The on-chip controller may determine command validity, for example, comparing the decoded command to a chart of valid commands, such as TABLE 1 below. Any combination that does not fall within this table would constitute an invalid command (e.g. 236 total invalid commands). It is noted that in the TABLE 1, the designation "X" represent either a high logic level or a low logic level, thus leading to 16 different combinations.

TABLE 1

| | Example Valid Commands | | | | | | | |
|---|---|---|---|---|---|---|---|---|
| Command | MSB | SC | CC | R/$\overline{\text{W}}$ | RSBS | RSB1 | RSB0 | SLEEP |
| Null Command | 0 | 0 | 0 | 0 | 0 | 0 | 0 | 0 |
| Sleep Mode | 1 | 0 | 0 | 0 | 0 | 0 | 0 | 1 |
| Single | 1 | 1 | 0 | 0 | 0 | 0 | 0 | 0 |

TABLE 1-continued

Example Valid Commands

| Command | MSB | SC | CC | R/$\overline{W}$ | RSBS | RSB1 | RSB0 | SLEEP |
|---|---|---|---|---|---|---|---|---|
| Conversion Continuous | 1 | 0 | 1 | 0 | 0 | 0 | 0 | 0 |
| Conversion Read/Write | 1 | 0 | 0 | X | X | X | X | 0 |

Upon a determination of an invalid command, FSM 900 moves from state S7 to the HOLD state as shown in FIG. 9A. FSM 900 will continue to reside in this HOLD state and ignore any further inputs/commands provided by the user at the SDI pin until a particular restart sequence is issued. During this time, the SDO pin is forced to a logic level 0 and remains at this logic level. FSM 900 also produces a STUCK signal in the HOLD state. In effect, therefore, FSM 900 locks the serial data input and output pins of the serial port interface of the ADC upon a determination of an invalid command. By locking in a HOLD state, FSM 900 prevents any corruption of the data stored in the internal on-chip registers. The user thereby loses control of the serial ports, and the chip goes into abeyance.

To regain control over the serial port interface, the user may be required to initiate a specific serial port restart sequence to the serial data input pin of the ADC. This restart sequence, for example, may be "P" consecutive logic level 1's applied to the SDI pin, such as 127 logic level 1's, followed by a logic level 0. FSM 910 depicted in FIG. 9B may be used to determine whether the proper restart sequence has been executed by the external device. Once state S(P) has been reached, FSM 910 generates a STOP signal. The STOP signal is deasserted only after the user sends an additional logic level 0 to the SDI pin. At that point, FSM 910 proceeds back to state S0. Thus, in the FSMs embodied in FIG. 9A and FIG. 9B, at least P consecutive logic level 1s, followed by a logic level 0, are required at the SDI pin to complete the serial port restart sequence to overcome the HOLD state. The STOP signal is used by FSM 900 to transition back to state S0. Although FSM 900 is in command mode when it enters state S0, FSM 900 will stay in state S0 unless the STOP signal is deasserted by FSM 910. Thus, the user regains control over the serial port only after the serial port restart sequence is completed. Various sequences of logic levels may be chosen as a restart sequence.

Serial Port Interface Operation

Figure 10A:
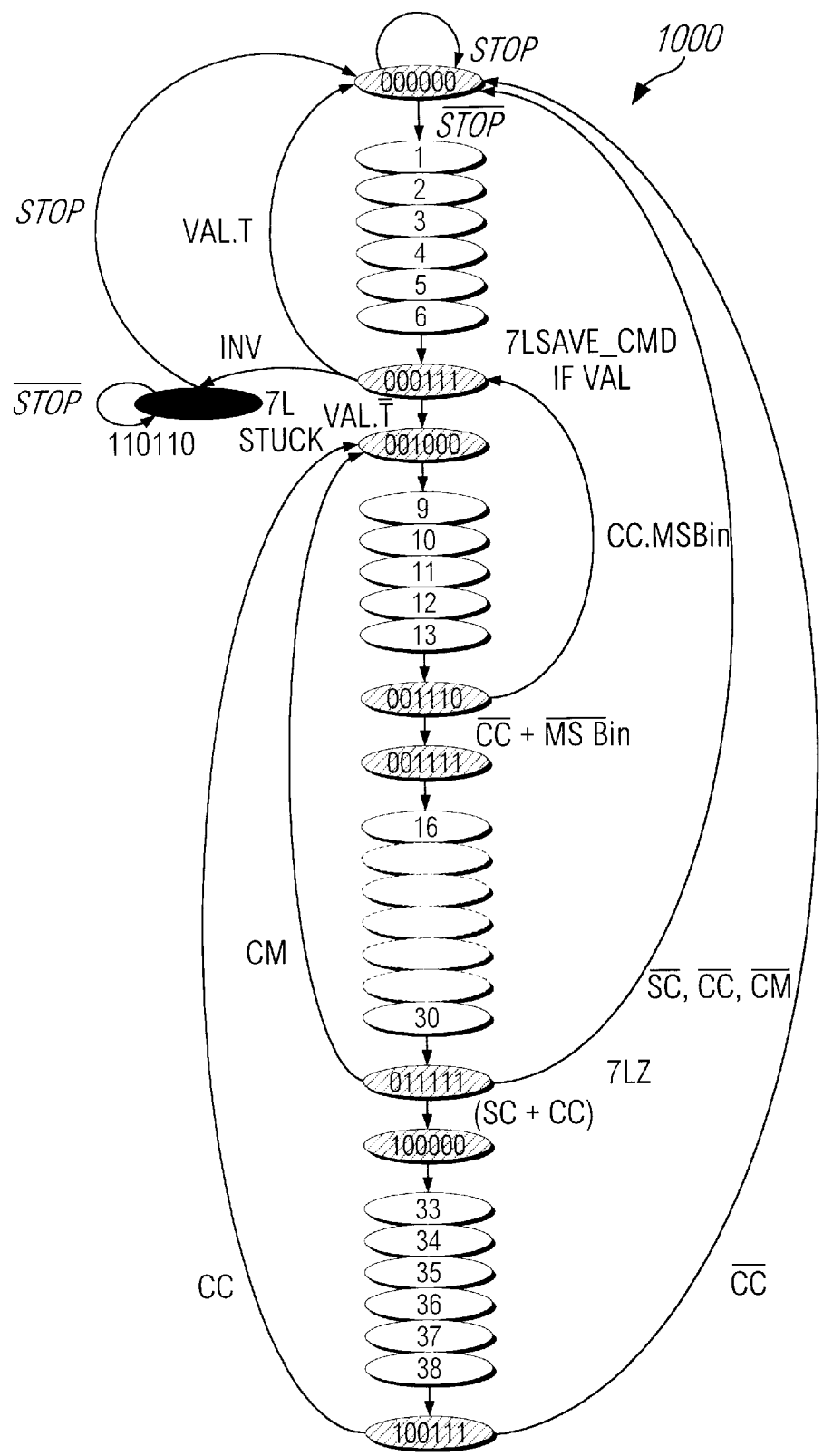
FIG. 10A is a finite state machine that incorporates aspects of the finite state machines depicted in FIGS. 8A–C and FIGS. 9A–B.
Figure 10B:
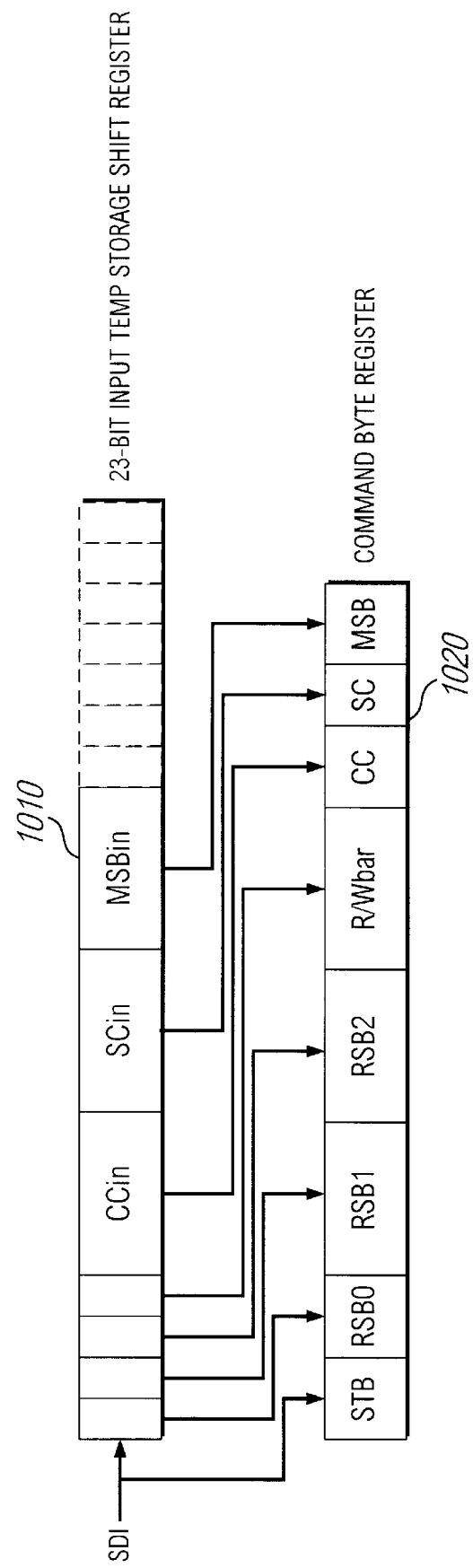
FIG. 10B is a diagram of a command register and an input storage shift register/buffer.

FIGS. 10A and 10B show an example finite state machine FSM 1000 that depicts much of the functionality of the multiple register access mode shown in FIGS. 8A–8C, the 3-pin conversion-done mode shown in FIGS. 6–7, and the lock mode shown in FIGS. 9A–9C. The states are represented by either a number or a 6-bit representation of those numbers ranging from 0 to 39, which is equivalent to state "000000" to state "100111." In FIG. 10A, the particular signals are set either as discussed above or according to TABLE 2 below.

TABLE 2

Signals Associated with FIG. 10A

| SIGNAL NAME | DESCRIPTION |
|---|---|
| VAL | Valid command signal (includes NULL) |
| INV | Invalid command signal (VAL_bar) |
| NULL | Null command signal |
| T | PF_bar · (SCin + CCin) + SDI + NULL |
| PF | Port Flag bit of Configuration register |
| CM | Signal issued by FSM 820 |
| STOP | Signal issued by FSM 910 |
| SC, SCin, CC, CCin, MSBin | Permanent and temporary logic values of the command byte |

FIG. 10B depicts other signals and data, such as CCin, SCin and MSBin. Shift register 1010 represents a temporary input storage shift register that is coupled to the SDI pin. Register 1020 represents the command byte register, and is updated on the next rising edge of SCLK following the assertion of save_cmd. The bits of the command register 1020 are connected to respective positions in the input temporary storage shift register 1010 with the least significant bit (LSB) of the command register 1020 being connected to the SDI pin.

As shown in FSM 1000, upon receiving an indication of an invalid command in state 7, FSM 1000 moves to the hold state 110110. When a valid command is received and T is at a logic level 1, FSM 1000 proceeds from state 7 to state 8 which corresponds to the chip entering the data mode. FSM 1000 shows aspects of the continuous conversion (CC=1) data read in 3-pin conversion-done (PF=1) mode, the single conversion (SC=1) data read in 3-pin conversion-done (PF=1) mode, the multiple register access mode, and the serial port interface lock mode.

Further modifications and alternative embodiments of this invention will be apparent to those skilled in the art in view of this description. For example, the use of different logic levels Is to identify assertion and deassertion of signals may be changed without affecting the operation of the device. It will also be recognized that the present invention is not to be limited to the specific bit-size of particular registers or the number of registers. Accordingly, this description is to be construed as illustrative only and is for the purpose of teaching those skilled in the art the manner of carrying out the invention. It is to be understood that the forms of the invention herein shown and described are to be taken as presently preferred embodiments. Equivalent elements may be substituted for those illustrated and described herein, and certain features of the invention may be utilized independently of the use of other features, all as would be apparent to one skilled in the art after having the benefit of this description of the invention.

What is claimed is:

1. A three-pin serial port interface system in an analog-to-digital converter for signaling an external device via a serial output pin that conversion data is ready to be accessed, comprising:

a multiple bit register having at least one bit allocated to select a three-pin conversion-done mode when set to a specific logic level;

a serial data input pin through which an external device may write data to said multiple bit register;

a serial data output pin through which conversion data may be read by said external device, said serial data output pin signaling said external device that said conversion data is ready to be accessed by transitioning from a first logic level to a second logic level when said at least one bit in said multiple bit register is set to said specific logic level to select said three-pin conversion-done mode; and a serial clock input pin through which said external device may time data being accessed through said serial data output pin.

2. The three-pin serial port interface system of claim 1, wherein said multiple bit register is a 24-bit configuration register in said analog-to-digital converter.

3. The three-pin serial port interface system of claim 1, wherein said serial output data pin transitions from said first logic level to said second logic level.

4. The three-pin serial port interface system of claim 1, wherein said first logic level is a logic level 1, and said second logic level is a logic level 0.

5. The three-pin serial port interface system of claim 1, further comprising a second multiple bit register having at least one bit indicating a single conversion mode, such that said serial data output pin transitions only once to indicate that said conversion data is ready when said single conversion mode and said conversion-done mode are selected.

6. The three-pin serial port interface system of claim 1, further comprising a second multiple bit register having at least one bit indicating a continuous conversion mode, such that said serial data output pin transitions each time conversion data is ready when said continuous conversion mode and said conversion-done mode are selected.

7. The three-pin serial port interface system of claim 6, wherein said second multiple bit register is an 8-bit command register in said analog-to-digital converter.

8. The three-pin serial port interface system of claim 1, wherein said serial clock input pin is a Schmitt-trigger input pin.

9. The three-pin serial port interface system of claim 1, further comprising synchronization circuitry communicating with said serial clock input pin and an internal data clock to synchronize clock signals.

10. A method for signaling an external device that conversion data is ready to be accessed from an analog-to-digital converter for a three-pin serial port interface, comprising:

selecting a three-pin conversion-done mode by setting through a serial data input pin at least one bit of a multiple bit register in an analog-to-digital converter to a specific logic level; and transitioning a serial data output pin from a first logic level to a second logic level when conversion data is ready to be accessed from said analog-to-digital converter.

11. The method of claim 10, further comprising the step of selecting a continuous conversion mode by setting through a serial data input pin at least one bit of a second multiple bit register to a specific logic level, and wherein said transitioning step includes transitioning said serial data output pin each time conversion data is ready to be accessed.

12. The method of claim 10, further comprising the step of selecting a single conversion mode by setting through a serial data input pin at least one bit of a second multiple bit register to a specific logic level, and wherein said transitioning step includes transitioning said serial data output pin only once.

13. The method of claim 10, further comprising the step of synchronizing serial clock input signals from an external device with an internal clock signal.

14. A serial port interface system in an analog-to-digital converter for locking a serial port interface upon determination of an invalid command, comprising:

a multiple bit command register having a set of valid codes;

a serial input pin through which an external device may write commands to said multiple bit command register; and a controller communicating with said multiple bit register and said serial input pin to determine command validity and to place said serial input pin in a hold state upon a determination of an invalid command.

15. The serial port interface system of claim 14, wherein said controller communicates with said serial input pin to release said serial input pin from said hold state when a predetermined restart sequence is applied to said serial input pin.

16. A method for locking a serial port interface of an analog-to-digital converter upon determination of an invalid command, comprising:

determining whether a command written to a command register of an analog-to-digital converter is a valid command; and placing a serial data input pin in a hold state upon a determination of an invalid command.

17. The method of claim 16, further comprising:

releasing said serial data input pin from said hold state only after a predetermined restart sequence is applied to said serial data input pin; and allowing a new command to be written to said command register.

18. The method of claim 17, wherein said predetermined restart sequence is a plurality of data bits applied to said serial data input pin at a first logic level followed by at least one data bit applied to said serial data input pin at a second logic level.

19. The method of claim 16, further comprising locking a serial data output pin at a specific logic level until said serial data input pin is released from said hold state.

20. A serial port interface system in an analog-to-digital converter for accessing a plurality of multiple bit registers with a single read/write command, comprising:

a plurality of multiple bit registers in an analog-to-digital converter to which data may be written and from which data may be read;

a multiple register access address associated with said plurality of multiple bit registers; and a multiple bit command register having a plurality of bits allocated to select an address of an internal register including said multiple register access address, and having at least one bit allocated to a read/write command, wherein a single read/write command with said multiple register access address selected will access each of said plurality of multiple bit registers in some predetermined sequence.

21. The serial port interface system of claim 20, wherein said plurality of multiple bit registers are of varying bit sizes.

22. The serial port interface system of claim 20, wherein said plurality of multiple bit registers include a 24-bit offset register, a 24-bit gain register and a 24-bit configuration register, and said multiple bit command register is an 8-bit command register.

23. A method for accessing a plurality of multiple bit registers in an analog-to-digital converter with a single read/write command, comprising:

provide a plurality of multiple bit registers to which data may be written and from which data may be read through a serial port interface in an analog-to-digital converter;

providing a multiple bit command register;

allocating a plurality of bits in said multiple bit command register to provide a plurality of addresses to select on-chip registers for read/write commands;

associating at least one of said addresses provided by said plurality of bits to be a multiple register access address;

allocating at least one bit in said multiple bit command register to select a read/write command;

selecting said multiple register access address for a single read/write command; and accessing each of said plurality of multiple bit registers with said single read/write command.

24. The method of claim 23, wherein said associating step comprises associating a first address with a first combination of said multiple bit registers, and associating a second address with a second combination of said multiple bit registers, and wherein said selecting step comprises selecting either said first or said second multiple register access address.

25. The method of claim 23 wherein said plurality of multiple bit registers are each 24-bit registers and said multiple bit command register is an 8-bit command register.

* * * * *